(12) United States Patent
McKee et al.

(10) Patent No.: US 11,055,695 B2
(45) Date of Patent: Jul. 6, 2021

(54) AUTOMATED SYSTEM AND METHOD FOR TESTING BANK IDENTIFICATION NUMBERS IN A NETWORKED SYSTEM

(71) Applicant: Discover Financial Services, Riverwoods, IL (US)

(72) Inventors: Matthew McKee, Riverwoods, IL (US); Peter Illian, Riverwoods, IL (US)

(73) Assignee: Discover Financial Services, Riverwoods, IL (US)

( * ) Notice: Subject to any disclaimer, the term of this patent is extended or adjusted under 35 U.S.C. 154(b) by 304 days.

(21) Appl. No.: 16/006,347

(22) Filed: Jun. 12, 2018

(65) Prior Publication Data

US 2018/0357633 A1 Dec. 13, 2018

Related U.S. Application Data

(60) Provisional application No. 62/518,263, filed on Jun. 12, 2017.

(51) Int. Cl.
*G06Q 20/34* (2012.01)
*G06Q 20/40* (2012.01)

(52) U.S. Cl.
CPC ........... *G06Q 20/34* (2013.01); *G06Q 20/401* (2013.01)

(58) Field of Classification Search
CPC ............. G06F 11/3688; G06F 11/3692; G06F 11/3668; G06F 21/44; G06F 11/3664; G06Q 20/3278; G06Q 20/20; G07F 7/088
USPC ...................................................... 705/35–45
See application file for complete search history.

(56) References Cited

U.S. PATENT DOCUMENTS

| | | | | |
|---|---|---|---|---|
| 5,208,447 A | * | 5/1993 | Kruse | G06Q 20/341 235/380 |
| 5,500,513 A | * | 3/1996 | Langhans | G06Q 20/4014 235/380 |
| 5,577,197 A | * | 11/1996 | Beck | G06F 11/3414 714/28 |
| 6,385,739 B1 | * | 5/2002 | Barton | G06F 11/006 713/189 |
| 6,785,845 B2 | * | 8/2004 | Venkataraman | G06F 11/3672 235/437 |
| 7,239,973 B2 | * | 7/2007 | Schahl | G01R 1/0416 235/492 |

(Continued)

FOREIGN PATENT DOCUMENTS

AU WO 01/04851 * 1/2001 ............. G07F 19/00

OTHER PUBLICATIONS

"Norway's domestic card scheme OKs new UL test tool module", ATM Marketplace, News Features; Louisville, Aug. 29, 2016, pp. 1-2. (Year: 2016).*

*Primary Examiner* — Mohammad Z Shaikh
(74) *Attorney, Agent, or Firm* — Leydig, Voit & Mayer, Ltd.

(57) ABSTRACT

A method of testing a payment processing network by a credit card company device comprising: (a) programming a terminal to self-initiate one or more authentication requests using test primary account numbers included in a range of test bank identification numbers; (b) determining whether the test primary account numbers included in the test bank identification numbers are received; and (c) in response to the determining that the test primary account numbers are received, determining that the terminal is performing well.

16 Claims, 4 Drawing Sheets

(56) References Cited

U.S. PATENT DOCUMENTS

| | | | |
|---|---|---|---|
| 7,702,613 B1* | 4/2010 | Dankenbring | G06F 11/3684 707/687 |
| 7,770,789 B2* | 8/2010 | Oder, II | G06Q 20/20 235/380 |
| 8,132,713 B2* | 3/2012 | Kekicheff | G06Q 20/3552 235/375 |
| 9,224,146 B2* | 12/2015 | Hayhow | G06Q 20/20 |
| 9,449,320 B1* | 9/2016 | Walters | G06Q 20/202 |
| 9,686,026 B1* | 6/2017 | Reed | G06K 19/06037 |
| 10,019,347 B2* | 7/2018 | Evans | G06F 11/3676 |
| 10,339,513 B1* | 7/2019 | Walters | G06Q 20/40 |
| 10,460,324 B1* | 10/2019 | Westen | G06F 11/0709 |
| 10,581,855 B1* | 3/2020 | Donovan | G06Q 20/30 |
| 10,698,795 B2* | 6/2020 | Riddick | G06F 11/3664 |
| 2005/0033543 A1* | 2/2005 | Kubitz | G06F 11/36 702/120 |
| 2005/0080581 A1* | 4/2005 | Zimmerman | G11C 5/04 702/117 |
| 2005/0127173 A1* | 6/2005 | Idol, Jr. | G06Q 20/20 235/383 |
| 2008/0165951 A1* | 7/2008 | Somers | G06Q 20/401 380/2 |
| 2008/0283590 A1* | 11/2008 | Oder, II | G06Q 20/20 235/380 |
| 2008/0283592 A1* | 11/2008 | Oder, II | G06Q 20/40 235/380 |
| 2011/0089232 A1* | 4/2011 | Kekicheff | G06Q 20/405 235/380 |
| 2012/0290420 A1* | 11/2012 | Close | G07G 1/14 705/17 |
| 2015/0031332 A1* | 1/2015 | Clark | H04W 12/12 455/411 |
| 2016/0034723 A1* | 2/2016 | Somani | G06Q 10/00 235/438 |
| 2016/0379181 A1* | 12/2016 | Nordlof | G06Q 20/38215 705/79 |
| 2017/0024828 A1* | 1/2017 | Michel | G06Q 40/12 |
| 2017/0061168 A1* | 3/2017 | Sundaram | G06K 7/0095 |
| 2017/0200148 A1* | 7/2017 | Ulrich | G06Q 20/401 |
| 2018/0096329 A1* | 4/2018 | Hamilton | G06Q 20/202 |
| 2018/0181960 A1* | 6/2018 | Fenton | G06Q 20/4093 |
| 2018/0285244 A1* | 10/2018 | Subramanian Jayaraman | G06F 11/3688 |
| 2019/0171450 A1* | 6/2019 | Werner | G06N 3/063 |

\* cited by examiner

AUTOMATED SYSTEM AND METHOD FOR TESTING BANK IDENTIFICATION NUMBERS IN A NETWORKED SYSTEM

CROSS-REFERENCE TO RELATED APPLICATIONS

This application claims the benefit of U.S. Provisional Application No. 62/518,263, filed Jun. 12, 2017, which is hereby incorporated by reference in its entirety.

BACKGROUND

Financial services companies, such as credit card companies and banks, need to know what bank identification numbers (BINs) are supported by individual point of sale systems at merchants. Generally, financial institutions have a range of BINs assigned to them by an organization, such as the American Bankers Association. BINs are used to identify a card issuing institution that issued a card to a card holder. For example, a BIN may be used to identify a particular credit card company that issued a credit card to a card holder. A BIN can be, for example, the first 4 digits of a credit card number or a debit card number.

Point of sale terminals are preprogrammed or dynamically programmed with particular BIN ranges. When a financial services company (or financial institution) acquires a new BIN range, terminals supporting the financial services company must be reprogrammed to include the new BIN range. Often a third party, such as an Acquirer/Processor is responsible for programming terminals. Therefore, it is often difficult, or nearly prohibitive for a financial institution to determine whether all terminals have been programmed or reprogrammed to include the new BIN range. Moreover, even if a terminal has been programmed or reprogrammed to accept a new bin range, it is also difficult for a financial services company to understand whether this software push has been successful in enabling a terminal to accept this new BIN range or whether this terminal accepts the BIN ranges that it was previously programmed to accept.

SUMMARY

In an embodiment, the disclosure provides a method of testing a payment processing network by a credit card company device including: (a) programming a terminal to self-initiate one or more authentication requests using test primary account numbers included in a range of test bank identification numbers; (b) determining whether the test primary account numbers included in the test bank identification numbers are received; and (c) in response to the determining that the test primary account numbers are received, determining that the terminal is performing well.

In another embodiment, the disclosure provides a credit card company device for testing a payment processing network. The credit card company device includes one or more processors and a computer readable medium containing instructions stored thereon such that when the instructions are executed by the processor, the processor is configured to facilitate performing: (a) programming a terminal to self-initiate one or more authentication requests using test primary account numbers included in a range of test bank identification numbers; (b) determining whether the test primary account numbers included in the test bank identification numbers are received; and (c) in response to the determining that the test primary account numbers are received, determining that the terminal is performing well.

In another embodiment, the disclosure provides a terminal including one or more processors and a computer readable medium containing instructions stored thereon such that when the instructions are executed by the processor, the processor is configured to facilitate performing: (a) receiving a software update for self-initiating one or more authentication requests using test primary account numbers included in a range of test bank identification numbers; (b) determining parameters for self-initiating the one or more authentication requests based on the software update; and (c) sending one or more authentication transactions to a credit card company device based on the parameters.

DETAILED DESCRIPTION

Figure 1:
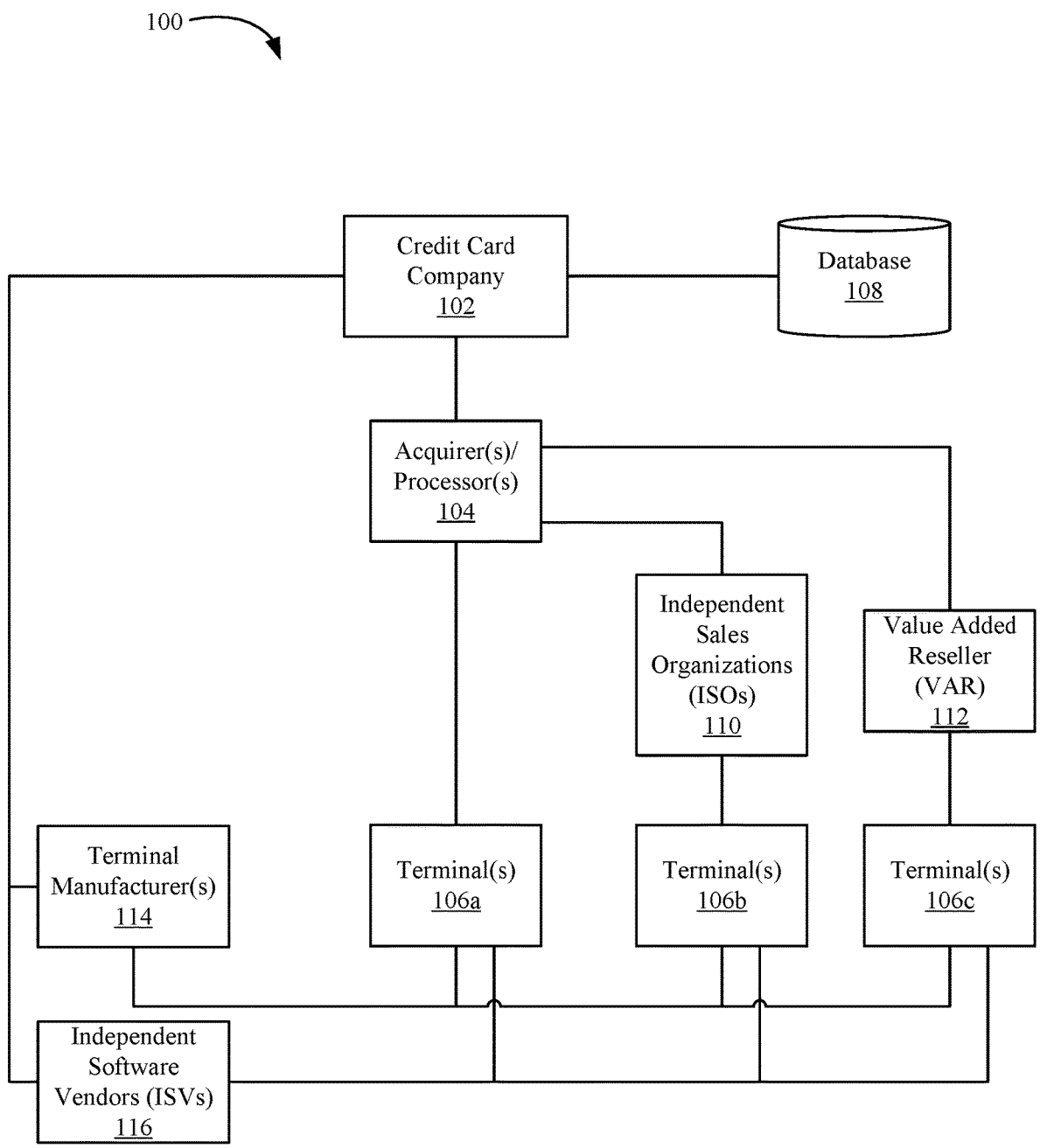
FIG. 1 is a system level diagram illustrating various entities involved in a payment processing network according to an embodiment of the disclosure.

Presently, when verifying the overall acceptance footprint of various BIN ranges at merchants within a given marketplace, financial institutions must send personnel to physically visit each merchant and test their terminals. Once at these terminals, these testing personnel manually swipe one or more test cards, to determine if the test cards, each of which corresponds to a particular BIN range the financial institutions wish to test, can successfully conduct a transaction at that terminal. Given the manual nature of the card testing process, it can be very time consuming and expensive to conduct. Given that financial institutions have both finite time and money to spend on the manual testing process each year, these institutions are thusly limited in the number of merchants/terminals they can test for acceptance. This limitation drives a significant amount of uncertainty within these financial institutions in terms of understanding the true acceptance footprint for each of the BIN ranges within their network. Moreover, this limitation also inhibits the financial institutions from knowing where to target resources for fixing problems, should they exist somewhere within their network.

Embodiments provide a system that enables automated testing of credit and debit card numbers within specific pre-defined numerical ranges, such as bank identification numbers (BINs) ranges. The system works across a broad range of credit card and/or debit card payment terminals within a network. The system may work with any kind of transaction at any type of end terminal. Additionally, embodiments of the disclosure provide a system for understanding acceptance or transmission breaks between merchant/terminal and card companies.

The automated testing process can be performed by updating the internal software within the terminals in a way that causes the terminals to self-initiate payment authorization transactions from desired BIN ranges at a pre-defined frequency, for example once per day, week, month, etc. If the terminal-initiated authorization transactions are observed by the financial institutions and entities higher up in the network (e.g. financial institutions, Acquirers, Issuers, etc.), then it can be determined that BIN ranges included in those transactions will work on that terminal. If transactions do not come through at the expected time, then it can be determined that that BIN range will not work at that terminal or that the BIN range fails at some intermediate point between the terminal and the card company or some other observing entity receiving the transactions.

Embodiments of the disclosure enhance reliability of a computing device and overall reliability of a computing network by determining whether one or more BINs will fail when being processed by the computing device. When a failure occurs, a link between observing entities in the computing network and the computing device can be suspected as being defective or the computing device can be suspected as being defective with respect to the one or more BINs that failed. The link is a communication path between the computing device and the observing entities. As such, embodiments of the disclosure incorporate intelligence in a network, e.g., a financial network, so that computing devices within the network self-test to determine problem areas. Self-diagnosis of computing devices is beneficial because a computing device can process some, but not all, of the BIN ranges being tested and an observing entity can receive these transactions. In this case, the link between the computing device and observing entities may be fine. The problem can then be associated with the computing device in that the computing device is capable of processing transactions across a limited number of BIN ranges and not all the BIN ranges being tested. This can be an indication that the computing device is an old device where core acceptance specifications have not been updated.

Embodiments of the disclosure provide a method of self-diagnosis and identification of problem areas without manual intervention. When a failure is identified, efforts can then be focused on resolving this reliability issue. Once resolved, the overall performance of the network is thus incrementally improved in a way that benefits the merchant (they will now be able to accept payment using BIN range(s) that previously failed), the Consumer (who will then be able to use their formerly rejected card at that location), the Acquirer (can receive more revenue from BINs that were previously unsupported), the Issuer, and others.

FIG. 1 is a system level diagram illustrating entities in a payment processing network 100 according to an embodiment of the disclosure. The network 100 includes a financial institution, such as the credit card company 102. The credit card company 102 is associated with one or more acquirer(s)/processor(s) 104, hereinafter referred to as acquirers 104. An acquirer 104 is the financial institution that processes credit card transactions, e.g., a bank. This can be an institution that facilitates the processing of transactions for physical brick and mortar stores, or an institution that owns platforms that make online purchases or purchases made within software applications possible (e.g. shopping cart platform providers and in-app payment processing providers). In some cases, an acquirer 104 may be associated with an Independent Sales Organization (ISO) 110. An ISO 110 may work with a value added reseller (VAR) 112 to repackage its point of sale (POS) application to customize a complete payment solution for a merchant's business. A VAR 112 is a service provider who acquires merchants and services its POS applications, or is involved in handling, transporting or routing a transaction to an acquirer 104. Database 108 is used by the credit card company 102 for retrieval and storage of information.

FIG. 1 also illustrates various terminals 106. Terminals 106a illustrate terminals that communicate directly with the acquirer/processor 104. Terminals 106b communicate with the acquirer 104 through the ISO 110. Terminals 106c communicate with the acquirer 104 through the VAR 112. The terminals (terminals 106a through 106c) should support various BIN ranges provided by the credit card company 102. Terminals are usually located at stores or facilities of a merchant. A merchant can have more than one terminal.

FIG. 1 also includes one or more terminal manufacturers 114 and one or more independent software vendors (ISVs) 116. Similar to some Acquirers and Independent Sales Organizations, the terminal manufacturers 114 and the ISVs 116 can provide software updates to one or more of terminals 106a through 106c.

Figure 2:
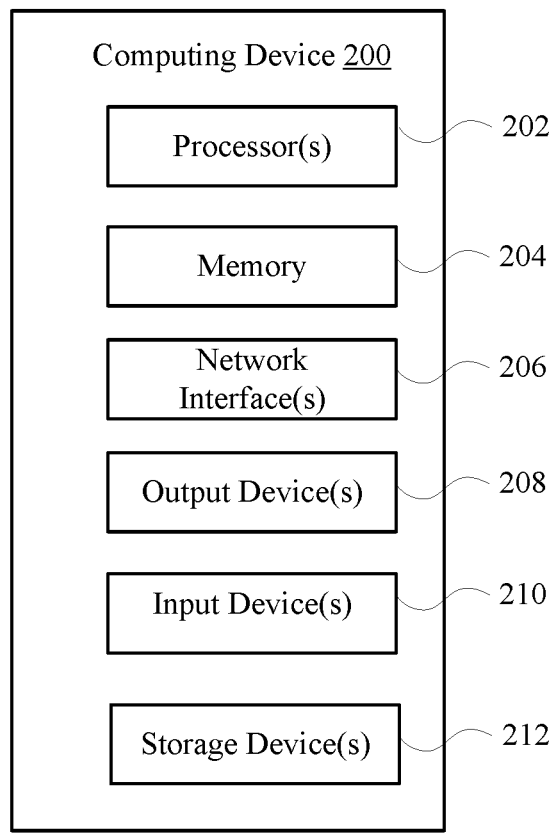
FIG. 2 is a computing device according to an embodiment of the disclosure.

FIG. 2 illustrates hardware components of a computing device 200 according to an embodiment of the disclosure. The computing device 200 may be used as terminals 106a, 106b, and 106c, servers at ISOs 110, servers at VARs 112, servers at acquirers 104, servers at the credit card company 102, servers for terminal manufacturers 114, and servers for ISVs 116. Computing device 200 may include one or more processors 202, memory 204, network interfaces 206, output devices 208, input devices 210, and storage devices 212. Each component provided is interconnected physically, communicatively, and/or operatively for inter-component communications in order to realize functionality ascribed to terminals and servers at each of the different entities provided in FIG. 1. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or retrieved instructions stored on storage device 212. Memory 204, which may be a non-transitory, computer-readable storage medium, is configured to store information within the computing device 200 during operation. In some embodiments, memory 204 includes a temporary memory that does not retain information stored when the device 200 is turned off. Examples of such temporary memory include volatile memories such as RAM, dynamic random access memories (DRAM), and static random access memories (SRAM).

Storage device 212 includes one or more non-transitory computer-readable storage media. Storage device 212 is provided to store larger amounts of information than memory 204, and in some instances, configured for long-term storage of information. In some embodiments, the storage device 212 includes non-volatile storage elements, e.g., floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Network interfaces 206 can include Wi-Fi, 3G, 4G, Long-Term Evolution (LTE), Bluetooth®, and other wireless radios.

The computing device 200 may also be equipped with one or more output devices 208 and/or one or more input devices 210. Output device 208 is configured to provide output to a user using tactile, audio, and/or video information. Input device 210 includes devices that provide interaction with the environment through tactile, audio, and/or video feedback. Examples of output device 208 may include a display (liquid crystal display (LCD) display, LCD/light emitting diode (LED) display, organic LED display, etc.), a sound card, a video graphics adapter card, speakers, and so on. Examples of input devices may include a presence-sensitive screen or a touch-sensitive screen, a mouse, a keyboard, a video camera, microphone, and a voice responsive system.

Figure 3:
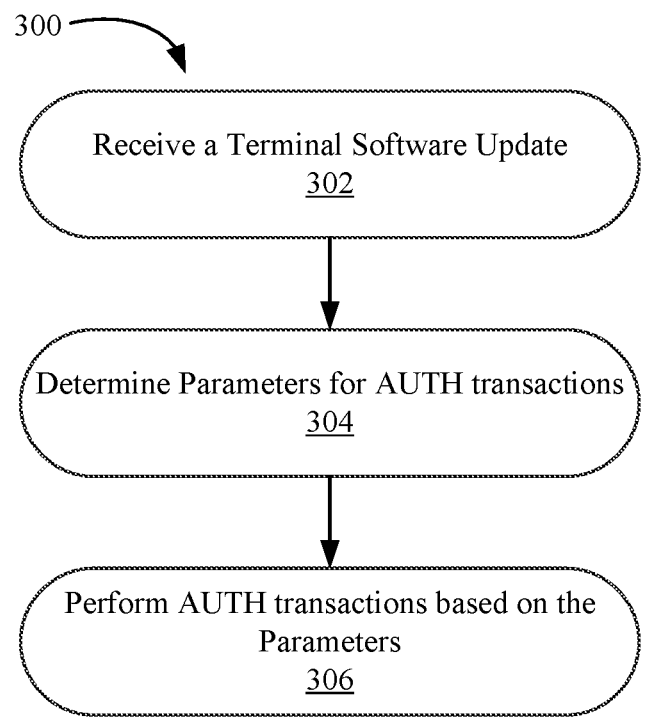
FIG. 3 is a flow diagram showing steps taken by a terminal for testing BIN ranges in a payment processing network according to an embodiment of the disclosure.

FIG. 3 is a flow diagram showing steps taken by a terminal, e.g., terminals 106a through 106c for testing BIN ranges in a payment processing network, according to an embodiment of the disclosure. At 302, the terminal receives a terminal software update. In an embodiment, terminal 106a receives a terminal software update from acquirer 104. In another embodiment, terminal 106a receives a terminal software update from terminal manufacturer 114. In another embodiment, terminal 106a receives a terminal software update from ISV 116.

At 304, the terminal installs the software update and determines parameters for performing self-initiated authorization (AUTH) transactions included in the software update. The parameters for performing AUTH transactions include primary account numbers (PANs) included in the BIN ranges for testing, a period or schedule for performing AUTH transactions using the predefined PANs in the BIN ranges, and an AUTH amount or amount for the AUTH transaction being processed. A PAN can be, e.g., a credit card or debit card number, and the first four digits of the PAN identify the BIN range in which that PAN resides. So, the software update can include two or more PANs with different numbers in the first four digits to test different BIN ranges. The AUTH amount can be $0 in some embodiments. The PANs in the BIN ranges that may be included in the software update are provided by the credit card company 102 to the appropriate entity that provides the terminal with the software update as described for stage 302. In some embodiments, some terminals contain PANs that are initially loaded onto each terminal prior to the time that the merchant takes acceptance of it. These PANs are PANs that cannot be changed without a further software update to the terminal. PANs that are not initially loaded onto each machine can be pushed by the credit card company 102 to the terminals through appropriate entities that provide the terminals with software updates.

At 306, the terminal performs the AUTH transactions based on the parameters. The self-initiated authorization transactions using PANs included in the BIN ranges for testing are then sent to the acquirer 104 and/or the credit card company 102 based on a schedule identified in the software update. The schedule can be periodic or aperiodic, depending on availability of the terminal and/or the specifications included in the terminal's software. In an embodiment, terminal 106a sends AUTH transactions to acquirer 104. In another embodiment, terminal 106b sends AUTH transactions to acquirer 104 through ISO 110. In another embodiment, terminal 106c sends AUTH transactions to acquirer 104 through VAR 112. Acquirer 104 relays the AUTH transactions to the credit card company 102. PANs in various BIN ranges can be tested over time through successive software updates. AUTH transactions do not have to be specially bundled and can progress through the financial network in a similar manner as any other transaction performed at a terminal.

Figure 4:
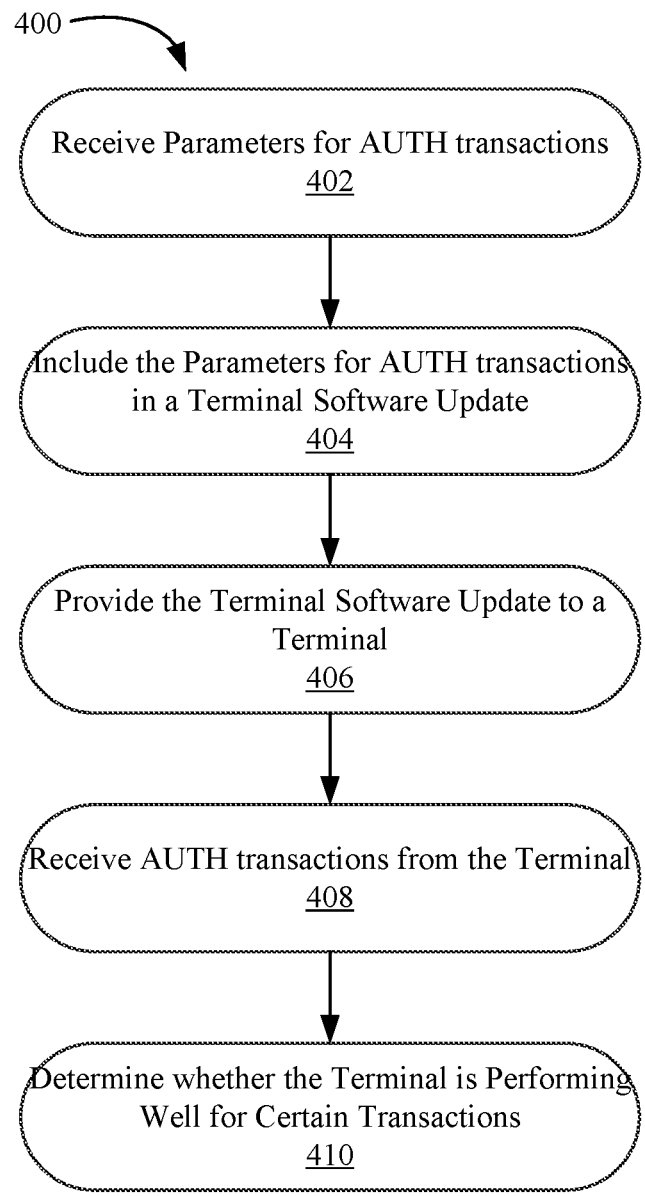
FIG. 4 is a flow diagram showing steps taken by an acquirer for testing BIN ranges in a payment processing network according to an embodiment of the disclosure.

FIG. 4 is a flow diagram showing steps taken by an acquirer, e.g., acquirer 104, for testing BIN ranges in a payment processing network according to an embodiment of the disclosure. At 402, the acquirer receives parameters for AUTH transactions from the credit card company 102.

At 404, the acquirer includes the parameters for the AUTH transactions in a terminal software update. At 406, the acquirer provides the terminal software update to a terminal. In other embodiments, steps 402 to 406 can be performed by the terminal manufacturers 114 or can be performed by the ISVs 116. In these embodiments, the terminal manufacturers 114 or the ISVs 116 receive the parameters for the AUTH transactions from the credit card company 102, include the parameters in the terminal software update, and provide the terminal software update to one or more terminals 106a, 106b, and/or 106c.

At 408, the acquirer receives AUTH transactions from the terminal. In an embodiment, the acquirer 104 directly receives an AUTH transaction from terminal 106a. In another embodiment, the acquirer 104 receives an AUTH transaction from terminal 106b through ISOs 110. In another embodiment, the acquirer 104 receives an AUTH transaction from terminal 106c through VAR 112.

At 410, the acquirer determines whether the terminal is performing well for certain AUTH transactions. If an AUTH transaction is expected from the terminal for a specific BIN range, but is not received, the acquirer can determine that there is an issue with the terminal or the payment processing network. In an embodiment, the acquirer 104 has a schedule for receiving AUTH transactions based on the terminal software update provided to the terminal. The acquirer 104 determines whether the terminal is performing well for certain AUTH transactions by checking to see whether an expected AUTH transaction has been received within the scheduled time for receiving the AUTH transaction. When an AUTH transaction is not received by a certain terminal, the acquirer 104 can alert other entities of the problem so that it can be solved.

In an embodiment, the acquirer forwards the AUTH transactions to the credit card company 102 such that the credit card company 102 determines whether the terminal is performing well for certain AUTH transactions.

In an embodiment, additional third parties may be able to test their own PANs and BIN ranges by, for example, paying a fee to the acquirer 104 to develop appropriate software for terminals to be tested. The third parties could be other financial institutions including credit card companies and banks.

Embodiments of the disclosure can be used to illuminate problem areas in a financial network. For example, a credit card company issues cards with multiple BIN ranges, and one of its less frequently issued BIN ranges is a BIN range that begins with the numbers 65. Given that the credit card company does not issue a lot of cards in 65 BIN range, the credit card company has no way of knowing whether the 65 BIN range acceptance in the marketplace is good. Due to the 65 BIN range being less frequently issued, the credit card company does not see a lot of transactions come in using the 65 BIN range. However, if there were ramp up of issuance of the 65 BIN range, the credit card company would be unable to determine how well the 65 BIN range is accepted at terminals in the marketplace. This uncertainty presents significant risk to financial operations of the credit card company. In addition, this uncertainty may also pose compliance risks to the credit card company since regulations may require that credit card companies support all their assigned BIN ranges including their less common BIN ranges. Embodiments of the disclosure provide a method and system for pushing software updates to one or more terminals and have those terminals self-initiate (at a predefined schedule) a variety of AUTH transactions, including some in the 65 BIN range. With the self-initiation of AUTH transactions, the credit card company can then obtain conclusive evidence of what the acceptance footprint of the 65 BIN range looks like—and which merchants may not currently support the 65 BIN range. Embodiments of the disclosure provide a way to determine problem areas that were previously hidden.

The invention claimed is:

1. A method of testing a payment processing network by a credit card company device, the method comprising:
   determining a link in a communication path between a network and a terminal is defective;
   determining, by the credit card company device, a problem area of the terminal by using intelligence in the network, wherein the intelligence in the network allows the terminal to self-test to determine the problem area, wherein the self-test comprises:
      providing the terminal with a terminal software update from an acquirer device, wherein the terminal software update includes parameters for performing self-initiated authorization transactions, and wherein the parameters include test bank identification numbers;
      programming the terminal for performing the self-initiated authorization transactions; and
      determining whether the self-initiated authorization transactions include test primary account numbers included in the test bank identification numbers, wherein:
         in response to the determining that the test primary account numbers are included in the test bank identification numbers, determining that the terminal is performing the self-initiated authorization transactions, or
         in response to the determining that the test primary account numbers are not included in the test bank identification numbers, determining that the terminal is not performing the self-initiated authorization transactions.

2. The method of claim 1,
   wherein the parameters further include a frequency for self-initiating one or more authentication requests, the test primary account numbers, authentication amounts for each of the one or more authentication requests, and a schedule associated with each of the test primary account numbers.

3. The method of claim 1, wherein:
   the terminal is programmed to self-initiate one or more authentication requests via at least one of the acquirer device, a terminal manufacturers device, or an independent software vendor device.

4. The method of claim 1, wherein:
   the self-initiated authorization transactions are routed via at least one of a value added reseller or an independent sales organization.

5. The method of claim 1, wherein determining whether the self-initiated authorization transactions include test primary account numbers included in the test bank identification numbers further comprises:
   determining whether the self-initiated authorization transactions are provided according to a schedule.

6. The method of claim 1, further comprising:
   in response to the determining that the test primary account numbers are not included in the test bank identification numbers, determining that there is a problem in processing at least one of the test primary account numbers.

7. The method of claim 6, further comprising:
   in response to determining that there is a problem, determining that test bank identification numbers associated with at least one of the test primary accounts are not supported by the terminal.

8. A credit card company device for testing a payment processing network, the credit card company device comprising one or more processors and a non-transitory computer readable medium containing instructions thereon such that when the instructions are executed by the processor, the processor is configured to facilitate performing:
   determining a link in a communication path between a network and a terminal is defective;
   determining a problem area of the terminal by using intelligence in the network, wherein the intelligence in the network allows the terminal to self-test to determine the problem area, wherein the self-test comprises:
      providing the terminal with a terminal software update from an acquirer device, wherein the terminal software update includes parameters for performing self-initiated authorization transactions, and wherein the parameters include test bank identification numbers;
      programming the terminal for performing the self-initiated authorization transactions; and
      determining whether the self-initiated authorization transactions include test primary account numbers included in the test bank identification numbers, wherein:
         in response to the determining that the test primary account numbers are included in the test bank identification numbers, determining that the terminal is performing the self-initiated authorization transactions, or
         in response to the determining that the test primary account numbers are not included in the test bank identification numbers, determining that the terminal is not performing the self-initiated authorization transactions.

9. The credit card company device of claim 8,
   wherein the parameters further include a frequency for self-initiating one or more authentication requests, the test primary account numbers, authentication amounts for each of the one or more authentication requests, and a schedule associated with each of the test primary account numbers.

10. The credit card company device of claim 8, wherein:
    the terminal is programmed to self-initiate one or more authentication requests via at least one of the acquirer device, a terminal manufacturers device, or an independent software vendor device.

11. The credit card company device of claim 8, wherein:
    the self-initiated authorization transactions are routed via at least one of a value added reseller or an independent sales organization.

12. The credit card company device of claim 8, wherein the processor is further configured to facilitate performing:
    determining whether the self-initiated authorization transactions are provided according to a schedule.

13. The credit card company device of claim 8, wherein the processor is further configured to facilitate performing:

in response to the determining that the test primary account numbers are not included in the test bank identification numbers, determining that there is a problem in processing at least one of the test primary account numbers.

14. A terminal comprising one or more processors and a non-transitory computer readable medium containing instructions thereon such that when the instructions are executed by the processor, the processor is configured to facilitate performing:

determining a link in a communication path between a network and a terminal is defective;

determining a problem area of the terminal by using intelligence in the network, wherein the intelligence in the network allows the terminal to self-test to determine the problem area, wherein the self-test comprises:

providing the terminal with a terminal software update from an acquirer device, wherein the terminal software update includes parameters for performing self-initiated authorization transactions, and wherein the parameters include test bank identification numbers;

programming the terminal for performing the self-initiated authorization transactions;

determining whether the self-initiated authorization transactions include test primary account numbers included in the test bank identification numbers, wherein;

in response to the determining that the test primary account numbers are included in the test bank identification numbers, determining that the terminal is performing the self-initiated authorization transactions, or in response to the determining that the test primary account numbers are not included in the test bank identification numbers, determining that the terminal is not performing the self-initiated authorization transactions.

15. The terminal according to claim 14, wherein the parameters include:

a frequency for self-initiating one or more authentication requests, the test primary account numbers, authentication amounts for each of the one or more authentication requests, and a schedule associated with each of the test primary account numbers.

16. The terminal according to claim 14, wherein:

the self-initiated authorization transactions are sent to a credit card company device via at least one of a value added reseller or an independent sales organization.

* * * * *